(12) United States Patent
Tseng et al.

(10) Patent No.: US 10,944,283 B2
(45) Date of Patent: Mar. 9, 2021

(54) DISTRIBUTED SINGLE-STAGE ON-BOARD CHARGING DEVICE AND METHOD THEREOF

(71) Applicant: Industrial Technology Research Institute, Hsin-Chu (TW)

(72) Inventors: Nan-Hsiung Tseng, Hsinchu (TW); Chun-Chen Lin, Taichung (TW); Hsieh-Tai Su, New Taipei (TW); Jih-Sheng Lai, Taipei (TW); Chin-Hone Lin, Nantou County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 523 days.

(21) Appl. No.: 15/852,153

(22) Filed: Dec. 22, 2017

(65) Prior Publication Data
US 2019/0199114 A1 Jun. 27, 2019

(51) Int. Cl.
*H02J 7/00* (2006.01)
*H02J 7/02* (2016.01)
(Continued)

(52) U.S. Cl.
CPC .............. *H02J 7/025* (2013.01); *B60L 53/22* (2019.02); *H02M 1/4208* (2013.01);
(Continued)

(58) Field of Classification Search
CPC ..................................................... H02J 7/025
(Continued)

(56) References Cited

U.S. PATENT DOCUMENTS 5,864,223 A * 1/1999 Meyer ................... H02J 7/0069
320/137
6,160,374 A 12/2000 Hayes et al.
(Continued)

FOREIGN PATENT DOCUMENTS

CN 101958660 A 1/2011
CN 102832838 A 12/2012
(Continued)

OTHER PUBLICATIONS

Chang-Yeol Oh et al., "A High-Efficient Nonisolated Single-Stage On-Board Battery Charger for Electric Vehicles", Dec. 2013, vol. 28, No. 12, pp. 5746-5757, IEEE Transactions on Power Electronics.
(Continued)

*Primary Examiner* — Yalkew Fantu
(74) *Attorney, Agent, or Firm* — WPAT, PC

(57) ABSTRACT

A distributed single-stage on-board charging device comprises a first transformer having a first primary winding and a first secondary winding; a first capacitor connected to the first primary winding; a first inductor connected to the first capacitor, wherein the first capacitor is located between the first inductor and the first transformer; a first transistor connected to the first capacitor and the first inductor; a first diode connected to the first secondary winding; a second transformer having a second primary winding and a second secondary winding, wherein the first transformer and the second transformer are connected in parallel; a second capacitor connected to the second primary winding; a second inductor connected to the second capacitor, wherein the second capacitor is located between the second inductor and the second transformer; and a second transistor connected to the second capacitor and the second inductor.

21 Claims, 14 Drawing Sheets

30

(51) Int. Cl.
*H02M 7/217* (2006.01)
*H02M 1/42* (2007.01)
*B60L 53/22* (2019.01)
*H02M 1/00* (2006.01)

(52) U.S. Cl.
CPC ......... *H02M 1/4258* (2013.01); *H02M 7/217* (2013.01); *B60L 2210/30* (2013.01); *B60L 2240/527* (2013.01); *B60L 2240/529* (2013.01); *H02J 2207/20* (2020.01); *H02M 2001/0064* (2013.01)

(58) Field of Classification Search
USPC ........................................................ 320/108
See application file for complete search history.

(56) References Cited

U.S. PATENT DOCUMENTS

| | | | |
|---|---|---|---|
| 6,664,762 B2 | 12/2003 | Kutkut | |
| 6,934,166 B2* | 8/2005 | Vinciarelli | H02J 1/102 363/17 |
| 7,149,097 B1 | 12/2006 | Shteynberg et al. | |
| 2010/0135044 A1* | 6/2010 | Chang | H02M 1/4258 363/15 |
| 2012/0039103 A1 | 2/2012 | Xu et al. | |
| 2013/0107581 A1 | 5/2013 | Krause | |
| 2014/0192562 A1 | 7/2014 | Cho et al. | |
| 2014/0233264 A1* | 8/2014 | Lin | H02M 1/4258 363/17 |
| 2015/0162842 A1* | 6/2015 | Lin | H02M 1/4258 363/21.02 |
| 2015/0162845 A1* | 6/2015 | Lee | H02M 3/335 363/17 |

FOREIGN PATENT DOCUMENTS

| | | |
|---|---|---|
| CN | 103269157 A | 8/2013 |
| CN | 104638900 A | 5/2015 |
| CN | 204681250 U | 9/2015 |
| CN | 106685242 | 5/2017 |
| CN | 206422704 U | 8/2017 |
| TW | 201025820 | 7/2010 |
| TW | M438760 | 10/2012 |
| TW | M453303 | 5/2013 |
| TW | 201720040 | 6/2017 |
| TW | 201728069 A | 8/2017 |
| WO | WO2004/036963 A1 | 4/2004 |

OTHER PUBLICATIONS

Jun-Young Lee et al, "A Single-Phase Battery Charger Design for LEV Based on DC-SRC With Resonant Valley-Fill Circuit", Apr. 2015, vol. 62, No. 4, pp. 2195-2205, IEEE Transactions on Industrial Electronics.

Md. Muntasir Ul Alam et al., "A single-stage bridgeless high efficiency ZVS hybrid-resonant off-road and neighborhood EV battery charger", Mar. 2014 , pp. 3237-3242, IEEE.

Ahmed M. Al Gabri et al., "Bridgeless PFC-Modified SEPIC Rectifier With Extended Gain for Universal Input Voltage Applications", Aug. 2015, vol. 30, No. 8, pp. 4272-4282, IEEE Transactions on Power Electronics.

Byeongwoo Kim et al, "Single-stage electrolytic capacitor-less AC-DC converter with high frequency isolation for EV charger", May 2016, IEEE 8th International Power Electronics and Motion Control Conference (IPEMC-ECCE Asia).

Siqi Li et al, "Single-Stage Resonant Battery Charger With Inherent Power Factor Correction for Electric Vehicles", Nov. 2013, vol. 62, No. 9, pags 4336-4344, IEEE Transactions on Vehicular Technology.

Devendra Path et al, "Compact Onboard Single-Phase EV Battery Charger With Novel Low-Frequency Ripple Compensator and Optimum Filter Design", Apr. 2016, vol. 65, No. 4, pp. 1948-1956, IEEE Transactions on Vehicular Technology.

Taiwan Intellectual Property Office, "Office Action", dated Sep. 6, 2018.

* cited by examiner

US 10,944,283 B2

DISTRIBUTED SINGLE-STAGE ON-BOARD CHARGING DEVICE AND METHOD THEREOF

TECHNICAL FIELD

The present disclosure relates to a distributed single-stage on-board charging device and a method thereof.

BACKGROUND

The power conversion system in an existing electric vehicle includes a charging system and a driving system, and each of the charging system and the driving system needs an independent circuit and an inverter to be respectively connected to the battery cells. The charging system uses an external alternating current (AC) power source to charge the battery cells, and the drive system is supplied with electric power from the battery cells to integrated starter generators (ISG) and traction motors.

In existing charging systems, an on-board charger is utilized between the external AC power source and the battery cells in order to convert the external AC power into a stable direct current (DC) power for charging the battery cells. Most of the existing charging systems can only achieve step-up charging, but cannot achieve step-down charging in a same system. If an existing charging system needs both step-up and step-down charging functions, the complexity of the circuit will increase. For example, a high-power storage inductor shall be used. Therefore, how to simplify the circuit topology of the electric power conversion system of an electric vehicle, how to reduce the cost and the volume, and achieving both step-up and step-down charging functions are important subjects to be solved at present.

SUMMARY

The present disclosure provides a distributed single-stage on-board charging device. The distributed single-stage on-board charging device comprises a first transformer having a first primary winding and a first secondary winding; a first capacitor connected to the first primary winding; a first inductor connected to the first capacitor, wherein the first capacitor is located between the first inductor and the first transformer; a first transistor connected to the first capacitor and the first inductor; a first diode connected to the first secondary winding; a second transformer having a second primary winding and a second secondary winding, wherein the first transformer and the second transformer are connected in parallel; a second capacitor connected to the second primary winding; a second inductor connected to the second capacitor, wherein the second capacitor is located between the second inductor and the second transformer; a second transistor connected to the second capacitor and the second inductor; and a second diode connected to the second secondary winding, wherein the first diode and the second diode are connected in parallel.

The present disclosure provides a distributed single-stage on-board charging method. The distributed single-stage on-board charging method comprises inputting an AC power; determining whether a constant voltage mode or a constant current mode is operating; performing a power factor correction on an AC current terminal and an AC voltage terminal of the AC power; performing, by a first transformer, a first step-up or step-down converting for a positive half-wave of the AC power; performing, by a second transformer, a second step-up or step-down converting for a negative half-wave of the AC power; and outputting a pulsating DC current.

DETAILED DESCRIPTION OF DISCLOSED EMBODIMENTS

Figure 1:
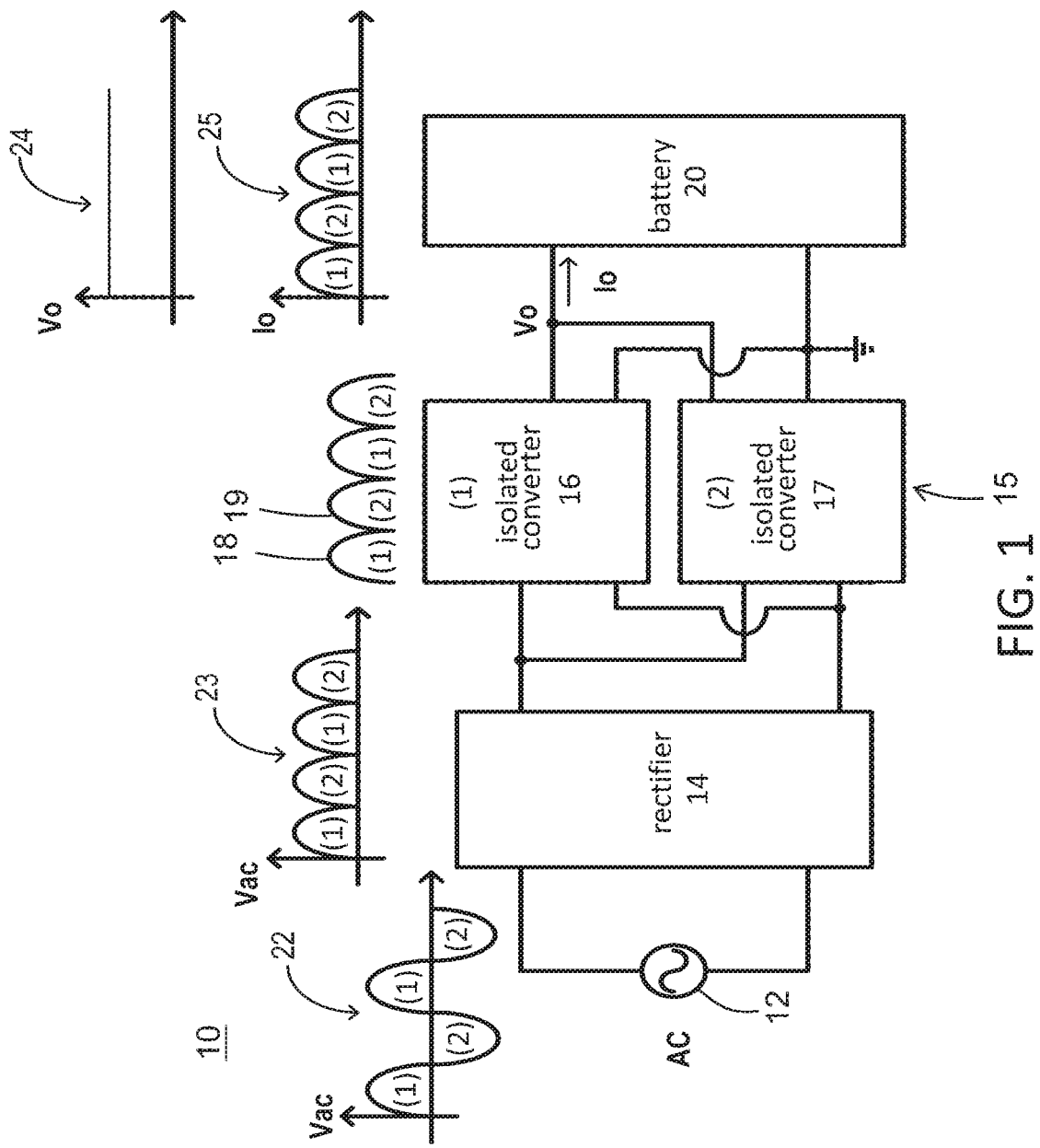
FIG. 1 is a diagram illustrating a charging framework in accordance with an embodiment of the present disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The present disclosure provides a distributed single-stage on-board charging device and a method thereof. The distributed single-stage on-board charging device is based on single ended primary inductive converters. The present disclosure further reduces the use of power components and simplifies the circuit topology of a single stage car charger. The present disclosure provides a control strategy that omits a DC to DC converter. The present disclosure associates with the control strategy to achieve pulsating DC charging, power conversion, and high voltage electrical isolation. Meanwhile, the distributed single-stage on-board charging device also meets the requirements of automotive safety regulations.

FIG. 1 is a diagram illustrating a charging framework 10 in accordance with an embodiment of the present disclosure. The charging framework 10 converts an external power source 12 into a steady DC power for charging a battery 20. The external power source 12 refers to an AC power source or a commercial power source (110/220 volts) whose voltage versus time relationship is as shown in a waveform 22. In the waveform 22, the voltage varies with time and is a sin wave with positive (labeled as (1)) and negative voltages (labeled as (2)). The AC voltage of the external power source 12 enters a rectifier 14. Concerning the rectifier 14, a bridge rectifier or a bridgeless rectifier for rectification is used optionally. The relationship between the rectified voltages and time is as shown in a waveform 23. The negative voltages are rectified to the positive voltages. The rectified voltages enter a distributed single-stage on-board charging device 15. The distributed single-stage on-board charging device 15 comprises an isolated converter 16 and an isolated converter 17. The isolated converter 16 is responsible for the power conversion of a positive half-wave 18, which performs voltage step-up (increasing voltage) or voltage step-down (decreasing voltage). The isolated converter 17 is responsible for the power conversion of a negative half-wave 19 (the original signal such as the negative half-wave of the waveform 22, which is rectified into a positive voltage), which performs voltage step-up (increasing voltage) or voltage step-down (decreasing voltage). The distributed single-stage on-board charging device 15 has functions of a power factor correction (PFC), a step-up and step-down converting, and a replacement of a DC to DC converter. The distributed single-stage on-board charging device 15 adjusts the phase differences between voltage and current, and performs a power factor adjustment on the input voltage. As such, the generation of virtual work is reduced and the utilization efficiency of energy is improved. In addition, the distributed single-stage on-board charging device 15 is capable of performing the voltage step-up and the voltage step-down processes. The step-up voltage and the reduced voltage are then used to charge the battery 20. The output voltage of the distributed single-stage on-board charging device 15, such as the charging voltage Vo, is as shown in a waveform 24. The charging voltage Vo is a constant DC voltage. The distributed single-stage on-board charging device 15 generates a pulsating DC current Io, which is characterized by a sine wave current having double line frequency shown as a waveform 25. In the charging framework 10, the external power source 12 is converted by the distributed single-stage on-board charging device 15 and directly transmitted to the battery 20. Therefore, a DC link capacitor and a second stage DC to DC converter are not required by the charging framework 10. As such, the size and the cost of the distributed single-stage on-board charging device 15 are greatly reduced.

Figure 2:
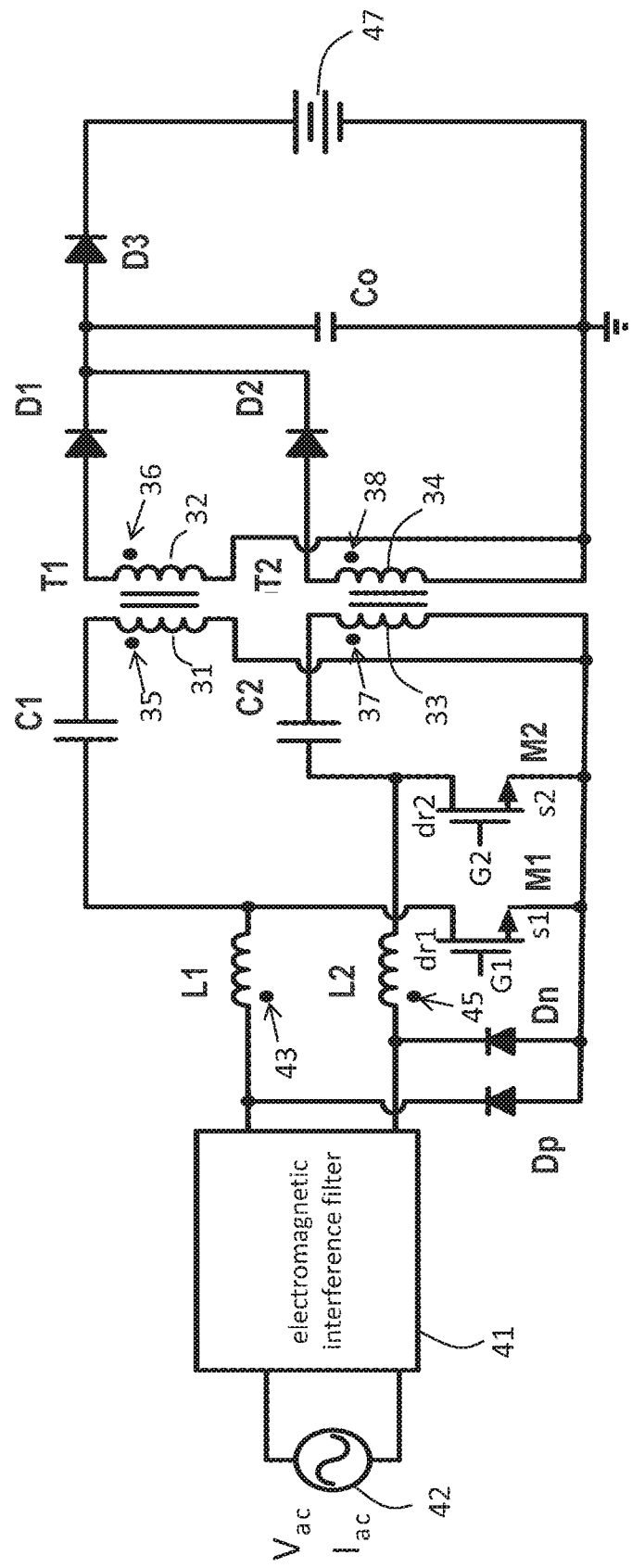
FIG. 2 is a circuit diagram illustrating a distributed single-stage on-board charging device in accordance with an embodiment of the present disclosure.

FIG. 2 is a circuit diagram illustrating a distributed single-stage on-board charging device 30 in accordance with an embodiment of the present disclosure. The distributed single-stage on-board charging device 30 comprises a first transformer T1 having a first primary winding 31 and a first secondary winding 32; a first capacitor C1 connected to the first primary winding 31; a first inductor L1 connected to the first capacitor C1, wherein the first capacitor C1 is located between the first inductor L1 and the first transformer T1; a first transistor M1 connected to the first capacitor C1 and the first inductor L1; a first diode D1 connected to the first secondary winding 32; a second transformer T2 having a second primary winding 33 and a second secondary winding 34, wherein the first transformer T1 and the second transformer T2 are connected in parallel; a second capacitor C2 connected to the second primary winding 33; a second inductor L2 connected to the second capacitor C2, wherein the second capacitor C2 is located between the second inductor L2 and the second transformer T2; a second transistor M2 connected to the second capacitor C2 and the second inductor L2; and a second diode D2 connected to the second secondary winding 34, wherein the first diode D1 and the second diode D2 are connected in parallel.

In an embodiment, in the first transformer T1, a starting winding end 35 of the first primary winding 31 connects to the first capacitor C1, and the first secondary winding 32 connects to an anode of the first diode D1. Wherein, a starting winding end 36 of the first secondary winding 32 connects to the anode of the first diode DE In the second transformer T2, a starting winding end 37 of the second primary winding 33 connects to the second capacitor C2, and the second secondary winding 34 connects to an anode of the second diode D2. Wherein, a starting winding end 38 of the second secondary winding 34 connects to the anode of the second diode D2.

In an embodiment, the first transformer T1 and the second transformer T2 are connected in parallel. An end (also referring to as an ending winding end) of the first primary winding 31 connects to an end (also referring to as an ending winding end) of the second primary winding 33, a source terminal s1 of the first transistor M1, and a source terminal s2 of the second transistor M2. An end (also referring to as an ending winding end) of the first secondary winding 32 and an end (also referring to as an ending winding end) of the second secondary winding 34 are grounded.

In an embodiment, concerning the first transistor M1 and the second transistor M2, a drain terminal dr1 of the first transistor M1 connects to the first capacitor C1 and the first inductor L1. A drain terminal dr2 of the second transistor M2 connects to the second capacitor C2 and the second inductor L2. A source terminal s1 of the first transistor M1 connects to a source terminal s2 of the second transistor M2. The first transistor M1 and the second transistor M2 may be, but not limited to metal-oxide-semiconductor field-effect transistors (MOSFETs) or insulated gate bipolar transistors (IGBT).

In an embodiment, the distributed single-stage on-board charging device 30 further comprises an electromagnetic interference (EMI) filter 41 located between an AC power 42 and the first inductor L1, also located between the AC power 42 and the second inductor L2. A starting winding end 43 of the first inductor L1 and a starting winding end 45 of the second inductor L2 respectively connect to the electromagnetic interference filter 41. The AC power 42 is inputted into the electromagnetic interference filter 41, and the electromagnetic interference filter 41 filters noise of the AC power 42.

In an embodiment, the distributed single-stage on-board charging device 30 further comprises a third capacitor Co connected to a cathode of the first diode D1 and a cathode of the second diode D2. Another end of the third capacitor Co is grounded. The distributed single-stage on-board charging device 30 further comprises an electric vehicle rechargeable battery 47 and a third diode D3. A cathode of the electric vehicle rechargeable battery 47 is grounded. An anode of the third diode D3 connects to the third capacitor Co, the cathode of the first diode D1, and the cathode of the second diode D2. An anode of the electric vehicle rechargeable battery 47 connects to a cathode of the third diode D3.

In an embodiment, the distributed single-stage on-board charging device 30 further comprises a fourth diode Dp and a fifth diode Dn. A cathode of the fourth diode Dp connects to a starting winding end 43 of the first inductor L1. A cathode of the fifth diode Dn connects to a starting winding end 45 of the second inductor L2. An anode of the fourth diode Dp connects to an anode of the fifth diode Dn, a source terminal s1 of the first transistor M1, a source terminal s2 of the second transistor M2, an end of the first primary winding 31, and an end of the second primary winding 33.

Figure 3:
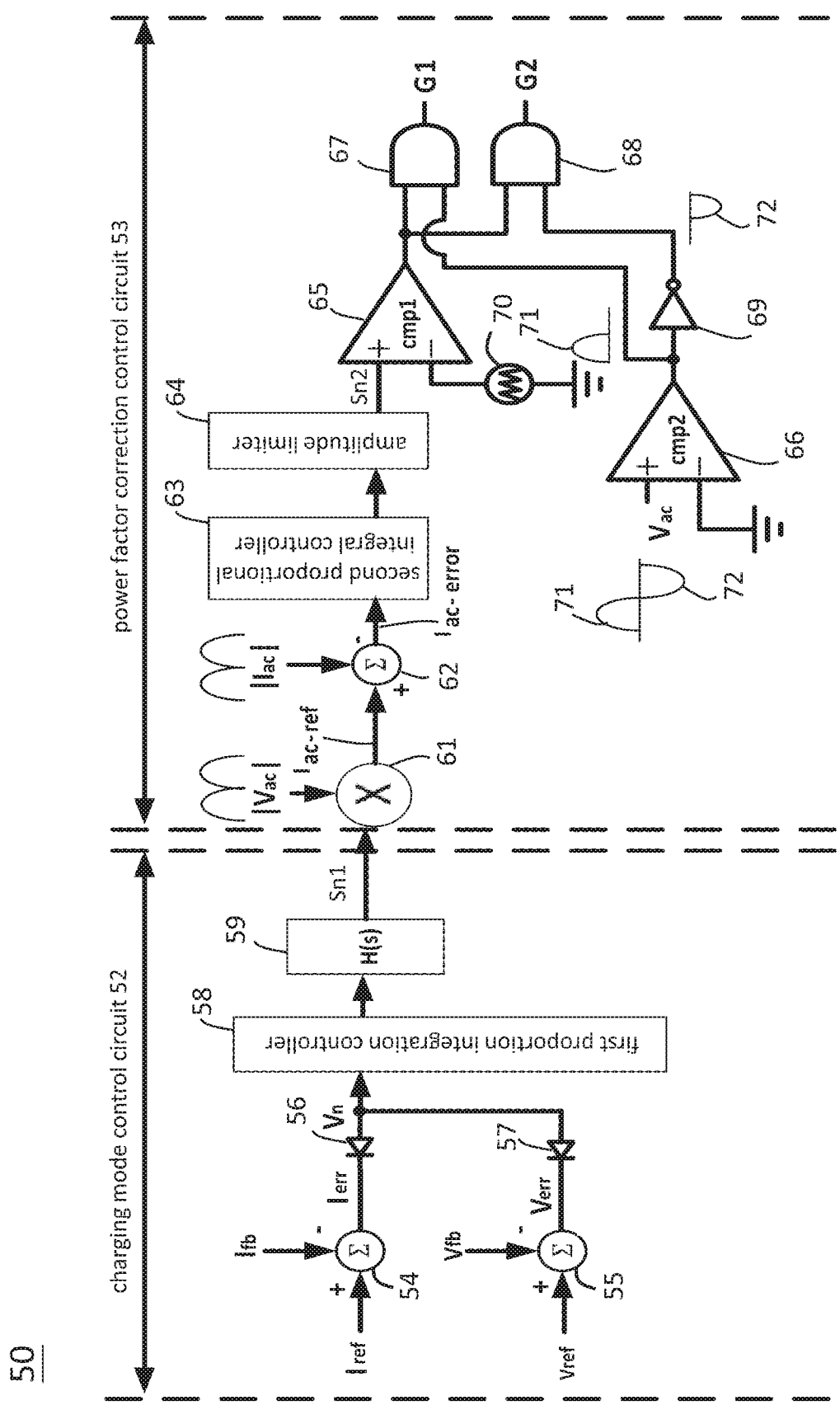
FIG. 3 is a circuit diagram illustrating a control circuit of the distributed single-stage on-board charging device in accordance with an embodiment of the present disclosure.

FIG. 3 is a circuit diagram illustrating a control circuit 50 of the distributed single-stage on-board charging device 30 in accordance with an embodiment of the present disclosure. The distributed single-stage on-board charging device 30 further comprises the control circuit 50. The control circuit 50 determines whether a constant voltage mode (CV mode) or a constant current mode (CC mode) is operating. The CV mode or the CC mode is chosen to charge the electric vehicle rechargeable battery 47. The control circuit 50 also performs a power factor correction. Two output terminals of the control circuit 50 respectively connect to a gate terminal G1 of the first transistor M1 and a gate terminal G2 of the second transistor M2. In brief, the control circuit 50 controls the first transistor M1 and the second transistor M2. In an embodiment, the control circuit 50 is implemented by a software method, such that the control circuit 50 is programmed into a digital signal processor (DSP). In an embodiment, the control circuit 50 is implemented by a field-programmable gate array (FPGA), but not limited thereto.

In an embodiment, the control circuit 50 comprises a charging mode control circuit 52 having the CV mode and the CC mode and a power factor correction control circuit 53. The charging mode control circuit 52 connects to the power factor correction control circuit 53. The charging mode control circuit 52 is indirectly coupled to the first transistor M1 and the second transistor M2. Two output terminals of the power factor correction control circuit 53 respectively connect to the gate terminal G1 of the first transistor M1 and the gate terminal G2 of the second transistor M2.

The control circuit 50 determines whether a constant voltage mode (CV mode) or a constant current mode (CC mode) is operating. The CV mode or the CC mode is chosen to charge the electric vehicle rechargeable battery 47. The charging mode control circuit 52 comprises a first adder 54, a sixth diode 56, a second adder 55, and a seventh diode 57. The first adder 54 is connected to a current feedback terminal $I_{fb}$ and a current reference command terminal $I_{ref}$. The first adder 54 is configured to output a difference value ($I_{ref}-I_{fb}$) between the current feedback terminal $I_{fb}$ and the current reference command terminal $I_{ref}$. The sixth diode 56 is connected to the first adder 54. The second adder 55 is connected to a voltage feedback terminal $V_{fb}$ and a voltage reference command terminal $V_{ref}$. The second adder 55 is configured to output a difference value ($V_{ref}-V_{fb}$) between the voltage feedback terminal $V_{fb}$ and the voltage reference command terminal $V_{ref}$. The seventh diode 57 is connected to the second adder 55, and the sixth diode 56 and the seventh diode 57 are connected in parallel.

Signals of the current feedback terminal $I_{fb}$ come from charging current signals of the electric vehicle rechargeable battery 47. The current reference command terminal $I_{ref}$ has a predetermined current value. Signals of the voltage feedback terminal $V_{fb}$ come from charging voltage signals of the electric vehicle rechargeable battery 47. The voltage feedback terminal $V_{fb}$ has a predetermined voltage value. The first adder 54 outputs a current error signal $I_{err}$ ($I_{ref}-I_{fb}=I_{err}$). The second adder 55 outputs a voltage error signal $V_{err}$ ($V_{ref}-V_{fb}=V_{err}$). Under the condition that the current error signal $I_{err}$ is less than the voltage error signal $V_{err}$, when a voltage difference between a node voltage Vn and the current error signal $I_{err}$ enables the sixth diode 56 to generate a forward bias, thereby resulting in being conductive. The current error signal $I_{err}$ enters a first proportion integration controller 58 so that the constant current mode (CC mode) is operating at this moment. Under the condition that the voltage error signal $V_{err}$ is less than the current error signal $I_{err}$, when a voltage difference between the node voltage Vn and the voltage error signal $V_{err}$ enables the seventh diode 57 to generate a forward bias, thereby resulting in being conductive. The voltage error signal $V_{err}$ enters the first proportion integration controller 58 so that the constant voltage mode (CV mode) is operating at this moment.

In an embodiment, the charging mode control circuit 52 comprises the first proportion integration controller 58 and a low pass filter 59. An input terminal of the first proportional integral controller 58 connects to an anode of the sixth diode 56 and an anode of the seventh diode 57. An input terminal of the low pass filter 59 connects to an output terminal of the first proportional integral controller 58. The output error signal of the first proportional integral controller 58 is proportional to the input error signal so that the system will generate a steady state error after entering the steady state. The low pass filter 59 filters high-frequency signals and passes low frequency signals. The low pass filter 59 outputs a charge control signal Sn1.

In an embodiment, the power factor correction control circuit 53 comprises a multiplier 61 connected to an output terminal of the charging mode control circuit 52 and a full-wave rectified AC voltage terminal $|V_{ac}|$; a third adder 62 connected to an output terminal of the multiplier 61 and a full-wave rectified AC current terminal $|I_{ac}|$; a second proportional integral controller 63 connected to an output terminal of the third adder 62; and an amplitude limiter 64 connected to an output terminal of the second proportional integral controller 63. The full-wave rectified AC voltage terminal $|V_{ac}|$ is retrieved from AC voltage signals of the AC power 42, which are full wave rectified. The full-wave rectified AC current terminal $|I_{ac}|$ is retrieved from AC current signals of the AC power 42, which are full wave rectified. The multiplier 61 receives the charge control signal Sn1 and signals of the full-wave rectified AC voltage terminal $|V_{ac}|$. The multiplier 61 outputs an AC current reference command $I_{ac-ref}$. The third adder 62 receives signals of the full-wave rectified AC current terminal $|I_{ac}|$ and the AC current reference command $I_{ac-ref}$. The third adder 62 outputs an AC current error command $I_{ac-error}$. The second proportional integral controller 63 receives the AC current error command $I_{ac\text{-}error}$. The second proportional integral controller 63 makes adjustments on a proportional control term and an integral control term. The amplitude limiter 64 prevents subsequent logic circuits from excessive amplitude signals or peak and removes overload signals. The amplitude limiter 64 outputs a power factor correction control signal Sn2.

In an embodiment, the power factor correction control circuit 53 further comprises a first comparator 65, a second comparator 66, a first AND gate 67, and a second AND gate 68. A positive terminal of the first comparator 65 indirectly couples to the second proportional integral controller 63. A negative terminal of the first comparator 65 connects to a high-frequency sawtooth wave terminal 70. A positive terminal of the second comparator 66 connects to an AC voltage terminal $V_{ac}$, and a negative terminal of the second comparator 66 is grounded. An output terminal of the first comparator 65 connects to the first AND gate 67 and the second AND gate 68. An output terminal of the second comparator 66 connects to the first AND gate 67. The power factor correction control circuit 53 further comprises a NOT gate 69 located between the second AND gate 68 and the second comparator 66. An input terminal of the NOT gate 69 connects to the output terminal of the second comparator 66, and an output terminal of the NOT gate 69 connects to the second AND gate 68. The high-frequency sawtooth wave terminal 70 outputs a high-frequency sawtooth wave. The AC voltage terminal $V_{ac}$ comprises a positive half-wave 71 and a negative half-wave 72. Associating with the first comparator 65, the second comparator 66 and the NOT gate 69 separate the positive half-wave 71 from the negative half-wave 72. Further, cooperating with the first AND gate 67 and the second AND gate 68, time sequences between the gate terminal G1 of the first transistor M1 and the gate terminal G2 of the second transistor M2 are distinguished. When the positive half-wave 71 and the negative half-wave 72 are respectively inputted to the first transistor M1 and the second transistor M1, on-off states of the first transistor M1 and the second transistor M2 are determined.

Figure 4:
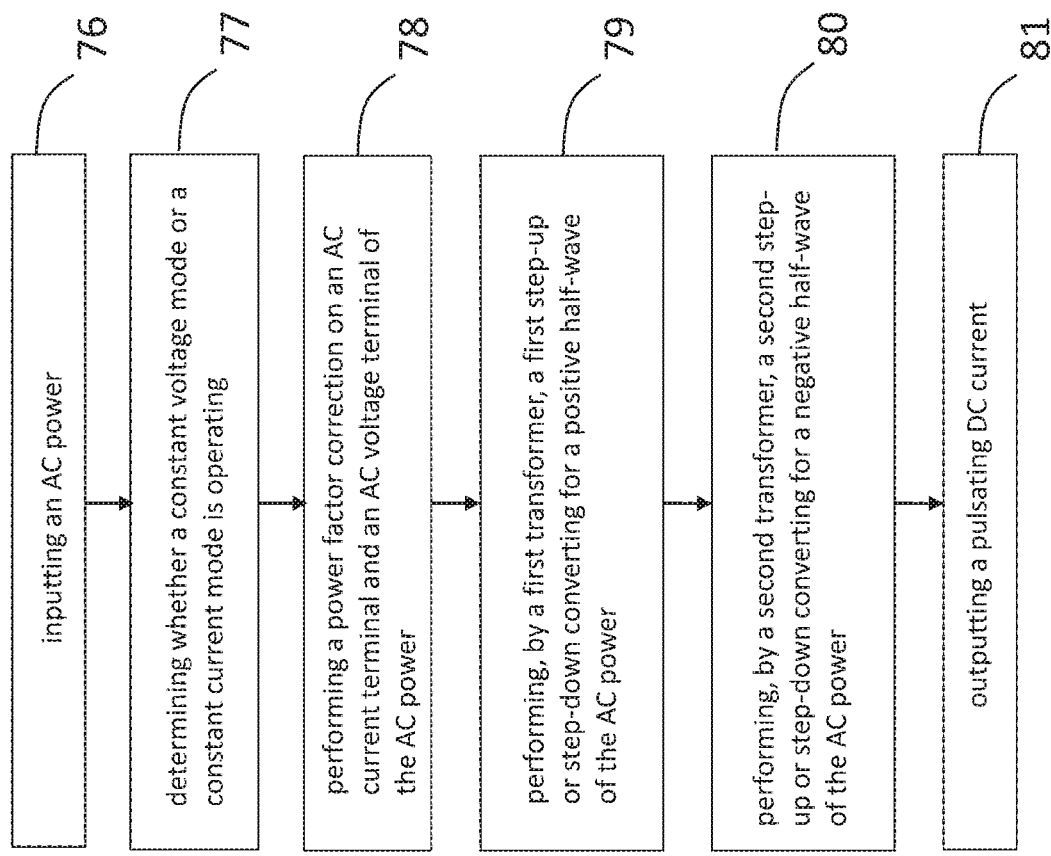
FIG. 4 is a flowchart illustrating a distributed single-stage on-board charging method in accordance with an embodiment of the present disclosure.

FIG. 4 is a flowchart illustrating a distributed single-stage on-board charging method 75 in accordance with an embodiment of the present disclosure. Also referring to FIG. 2 and FIG. 3, the distributed single-stage on-board charging method 75 comprises steps from 76 up to 81. In the step 76, the AC power 42 (having the AC voltage terminal $V_{ac}$ and the AC current terminal $I_{ac}$) is inputted to the distributed single-stage on-board charging device 30. By using the charging mode control circuit 52, signals of the current feedback terminal $I_{fb}$ and the voltage feedback terminal $V_{fb}$ are retrieved from the electric vehicle rechargeable battery 47. In the step 77, by using the charging mode control circuit 52, determining whether a constant voltage mode or a constant current mode is operating. In the step 78, by using the power factor correction control circuit 53, a power factor correction is performed on the AC voltage terminal $V_{ac}$ and the AC current terminal $I_{ac}$ of the AC power 42. In the step 79, for the positive half-wave 71 of the AC power 42, a step-up or step-down converting is performed by using the first transformer T1. In the step 80, for the negative half-wave 72 of the AC power 42, a step-up or step-down converting is performed by using the second transformer T2. In the step 81, by using the distributed single-stage on-board charging device 30, a pulsating DC current is outputted.

Figure 5:
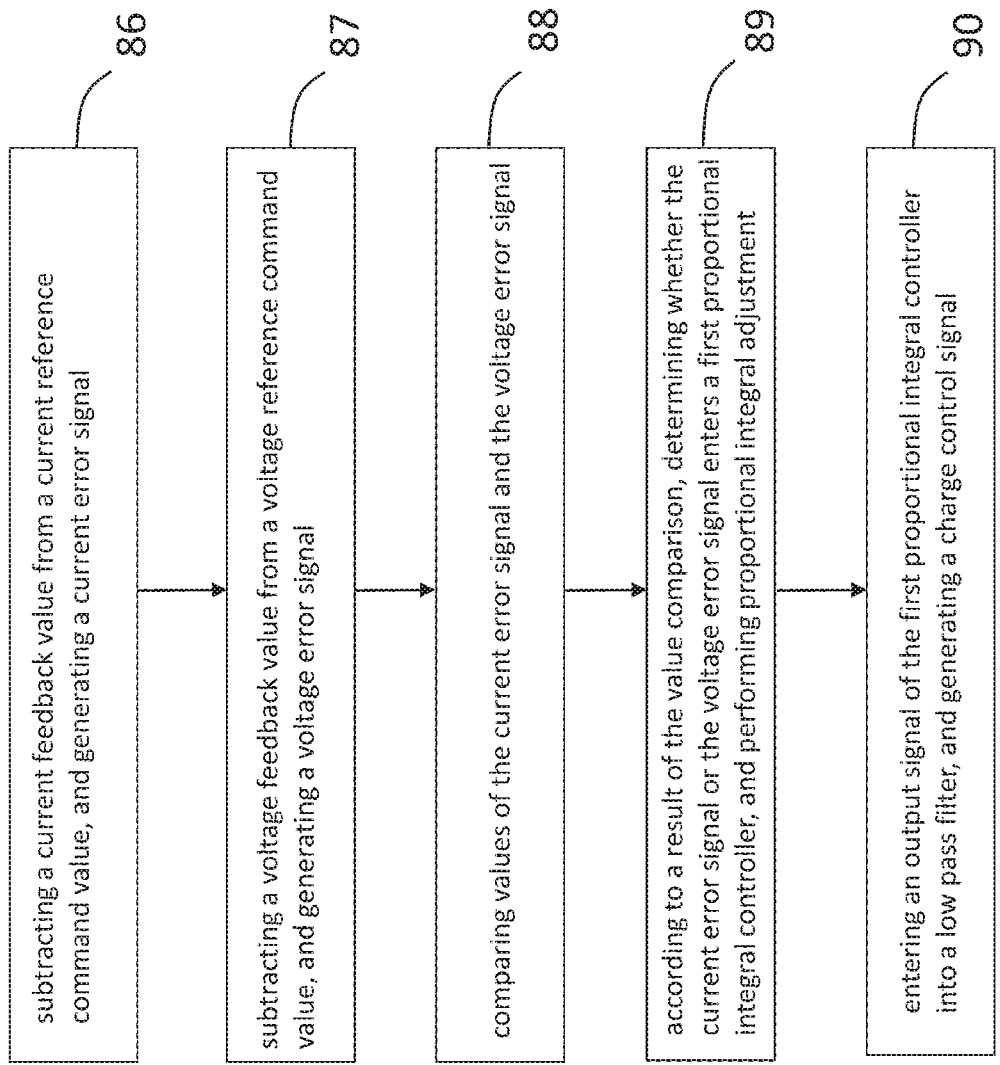
FIG. 5 is a detailed flowchart illustrating the step of determining whether a constant voltage mode or a constant current mode of FIG. 4 is operating in accordance with an embodiment of the present disclosure.

FIG. 5 is a detailed flowchart illustrating the step 77 of the distributed single-stage on-board charging method 75 in accordance with an embodiment of the present disclosure. Also referring to FIG. 3, the step 77 of determining whether the constant voltage mode or the constant current mode is operating, further comprises steps from 86 up to 90. In the step 86, a current feedback value of the current feedback terminal $I_{fb}$ is subtracted from a current reference command value of the current reference command terminal $I_{ref}$, and then a current error signal $I_{err}$ ($I_{ref}-I_{fb}=I_{err}$) is generated. In the step 87, a voltage feedback value of the voltage feedback terminal $V_{fb}$ is subtracted from a voltage reference command value of the voltage reference command terminal $V_{ref}$, and then a voltage error signal $V_{err}$ is generated. In the step 88, values of the current error signal $I_{err}$ and the voltage error signal $V_{err}$ are compared. In the step 89, according to a result of the value comparison, whether the current error signal $I_{err}$ or the voltage error signal $V_{err}$ enters a first proportional integral controller 58 is determined, and a proportional integral adjustment is performed. In the step 90, an output signal of the first proportional integral controller 58 enters a low pass filter 59, and the low pass filter 59 generates a charge control signal Sn1.

In the step 88, under the condition that the value of the current error signal $I_{err}$ is less than the value of the voltage error signal $V_{err}$, the current error signal $I_{err}$ enters a first proportion integration controller 58 so that the constant current mode (CC mode) is operating at this moment. Under the condition that the value of the voltage error signal $V_{err}$ is less than the value of the current error signal $I_{err}$, the voltage error signal $V_{err}$ enters the first proportion integration controller 58 so that the constant voltage mode (CV mode) is operating at this moment.

Figure 6:
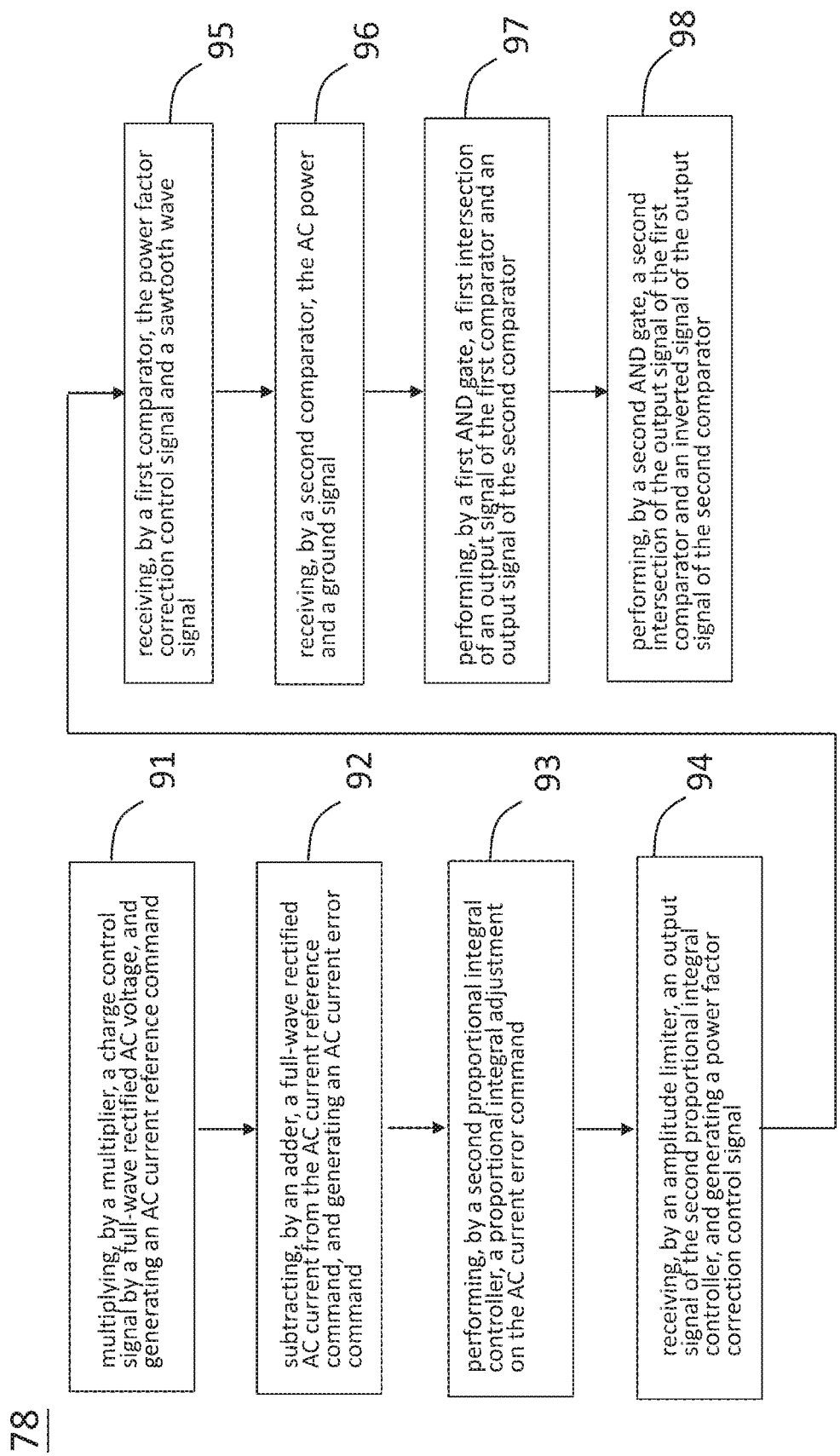
FIG. 6 is a detailed flowchart illustrating the step of performing a power factor correction on an AC voltage terminal and an AC current terminal of an AC power of FIG. 4 in accordance with an embodiment of the present disclosure.

FIG. 6 is a detailed flowchart illustrating the step 78 of the distributed single-stage on-board charging method 75 in accordance with an embodiment of the present disclosure. Also referring to FIG. 2 and FIG. 3, the step 78 of performing the power factor correction on the AC voltage terminal $V_{ac}$ and the AC current terminal $I_{ac}$ of the AC power 42 further comprises steps from 91 up to 98. In the step 91, by using a multiplier 61, the charge control signal Sn1 is multiplied by the full-wave rectified AC voltage value of the full-wave rectified AC voltage terminal $|V_{ac}|$. And then the AC current reference command $I_{ac\text{-}ref}$ is generated by the multiplier 61. In the step 92, by the third adder 62, the full-wave rectified AC current value of the full-wave rectified AC current terminal $|I_{ac}|$ is subtracted from the AC current reference command $I_{ac\text{-}ref}$. And then the AC current error command $I_{ac\text{-}error}$ is generated by the third adder 62. In the step 93, by using the second proportional integral controller 63, a proportional integral adjustment is performed on the AC current error command $I_{ac\text{-}error}$. In the step 94, by using an amplitude limiter 64, an output signal of the second proportional integral controller 63 is received. And then the power factor correction control signal Sn2 is generated by the amplitude limiter 64.

In the step 95, by using the first comparator 65, the power factor correction control signal Sn2 and the sawtooth wave signal of a high-frequency sawtooth wave terminal 70 are received. In the step 96, by using the second comparator 66, the AC power 42 and the ground signal are received. In the step 97, by using the first AND gate 67, an intersection of an output signal of the first comparator 65 and an output signal of the second comparator 66 is performed. In the step 98, by a second AND gate 68, an intersection of the output signal of the first comparator 65 and an inverted signal of the output signal of the second comparator 66 is performed.

Figure 7:
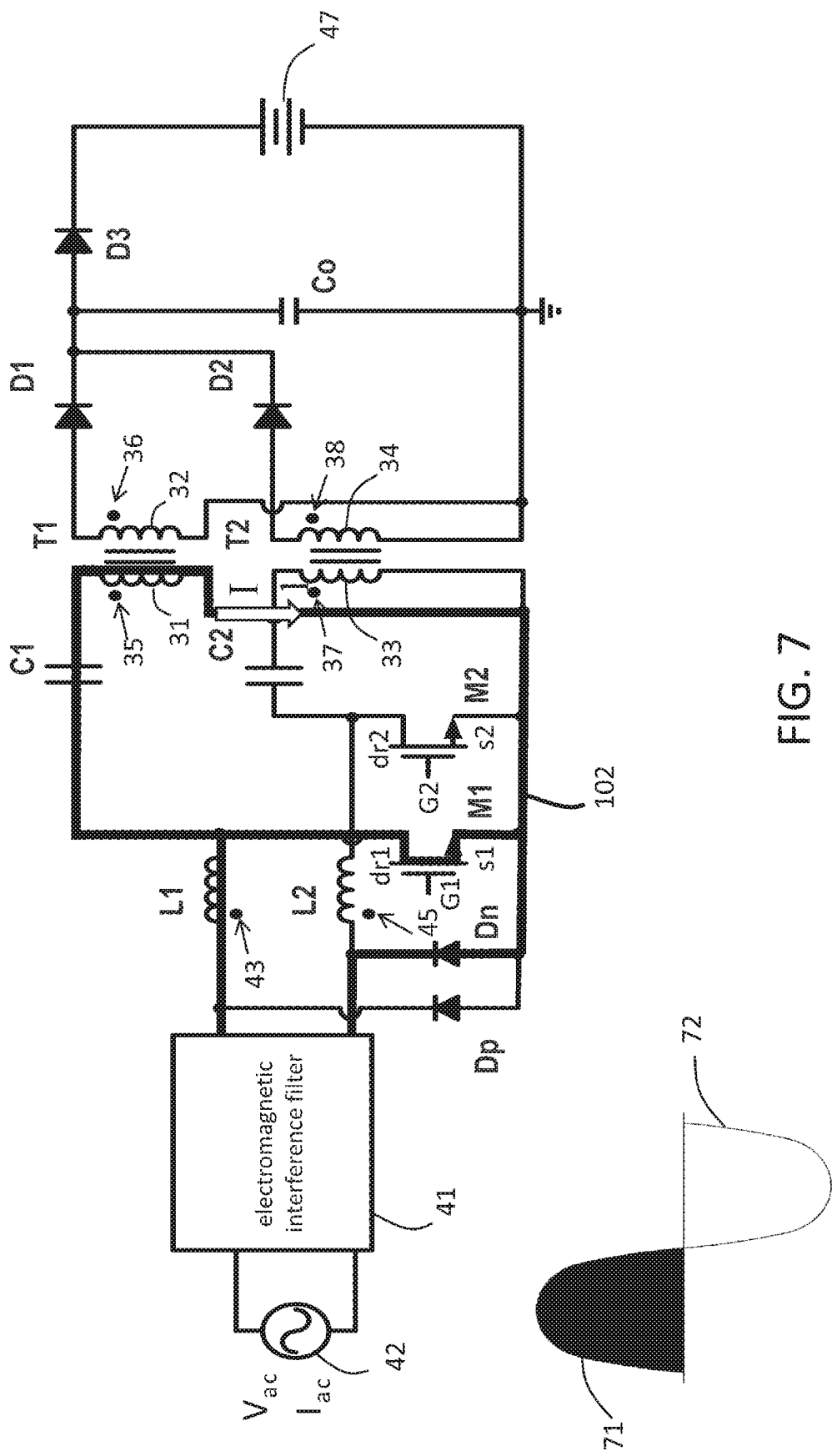
FIG. 7 is a diagram illustrating the step of performing a first step-up or step-down converting by a first transformer for a positive half-wave of the AC power of FIG. 4 in accordance with an embodiment of the present disclosure.

FIG. 7 is a diagram illustrating the step 79 of the distributed single-stage on-board charging method 75 in accordance with an embodiment of the present disclosure. The step 79 of performing a step-up or step-down converting by the first transformer T1, for the positive half-wave 71 of the AC power 42, further comprises following steps. The first transistor M1 is turned on, and the second transistor M2 is turned off. A loop 102 of the first capacitor C1, the first inductor L1, and the first primary winding 31 of the first transformer T1 is conducted. Primary current I1 is generated by the first transformer T1. Further, the loop 102 turns on the fifth diode Dn and enters an electromagnetic interference filter 41. In an embodiment, the AC power 42 has a frequency of 60 hertz. The first transformer T1 and the second transformer T2 are switched at a frequency of 70 hertz.

Figure 8:
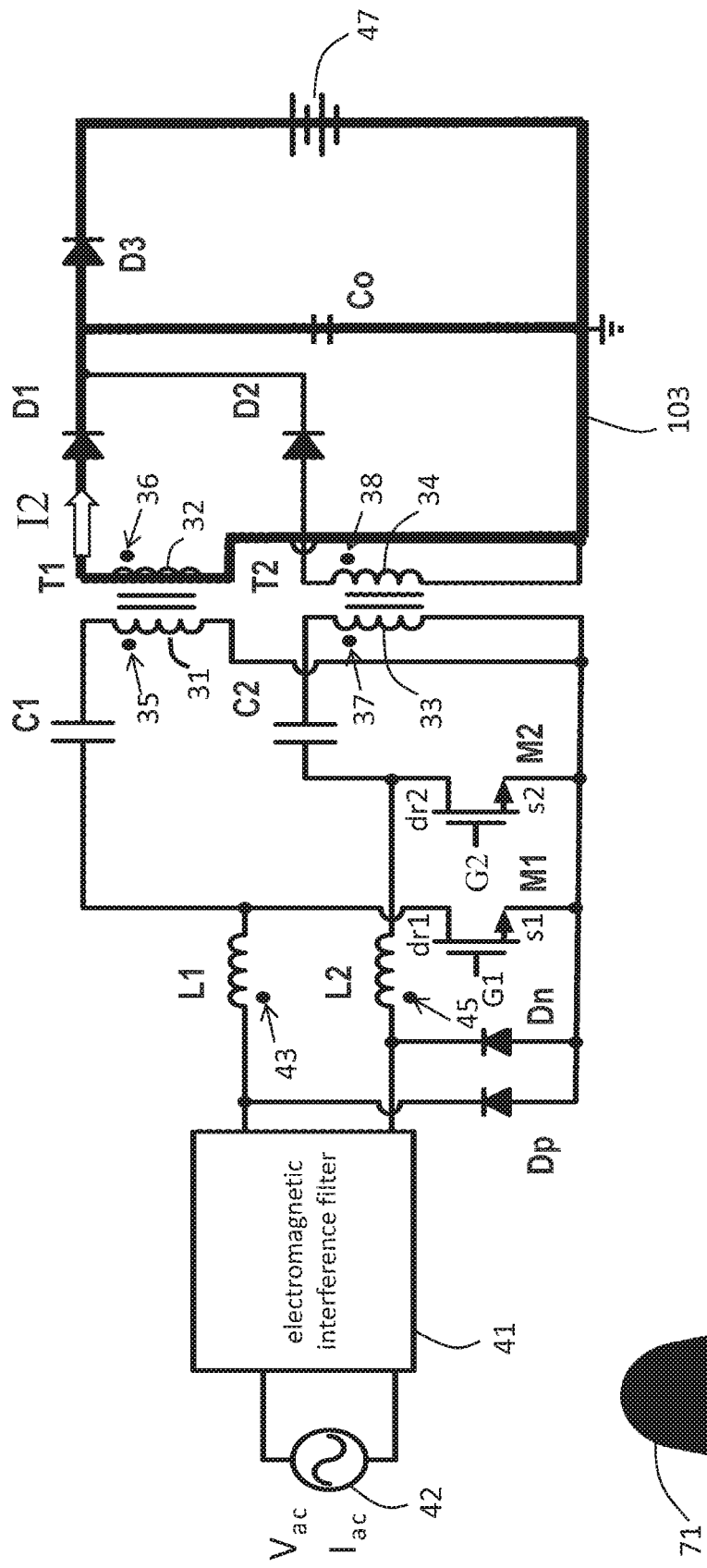
FIG. 8 is another diagram illustrating the step of performing the first step-up or step-down converting by the first transformer for the positive half-wave of the AC power of FIG. 4 in accordance with an embodiment of the present disclosure.

FIG. 8 is another diagram illustrating the step 79 of the distributed single-stage on-board charging method 75 in accordance with an embodiment of the present disclosure. The step 79 of performing a step-up or step-down converting by the first transformer T1, for the positive half-wave 71 of the AC power 42, further comprises the following steps. The first transistor M1 is turned off, and the second transistor M2 is turned off. Secondary current I2 is generated by the first secondary winding 32 of the first transformer T1. A loop 103 of the first diode D1, the third capacitor Co, the third diode D3, and the electric vehicle rechargeable battery 47 is conducted. The third capacitor Co has a smaller capacitance so that the secondary current I2 charges the electric vehicle rechargeable battery 47 after the third capacitor Co is fully charged.

Figure 9:
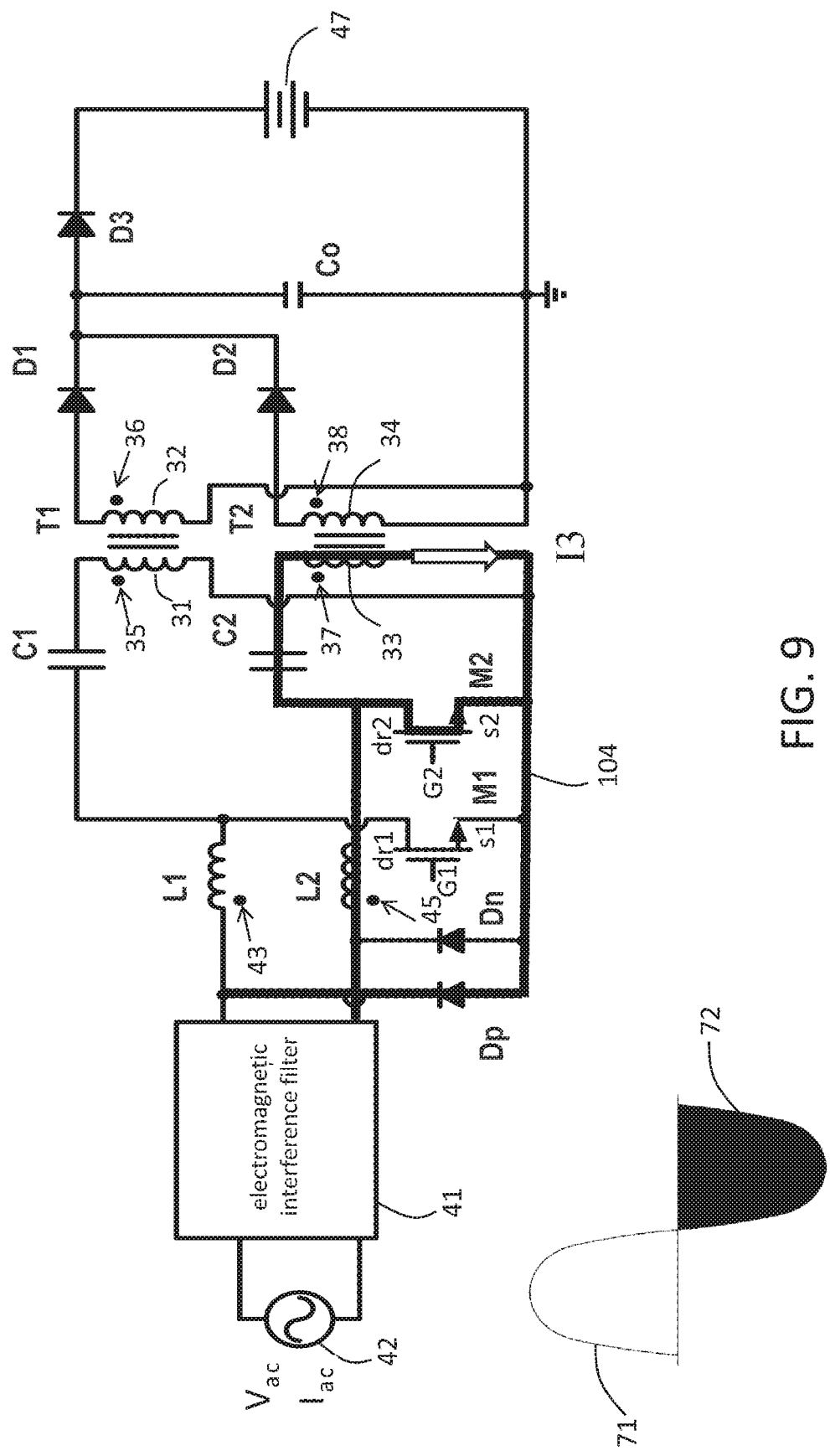
FIG. 9 is a diagram illustrating the step of performing a second step-up or step-down converting by a second transformer for a negative half-wave of the AC power of FIG. 4 in accordance with an embodiment of the present disclosure.

FIG. 9 is a diagram illustrating the step 80 of the distributed single-stage on-board charging method 75 in accordance with an embodiment of the present disclosure. The step 80 of performing a step-up or step-down converting by the second transformer T2, for the negative half-wave 72 of the AC power 42, further comprises the following steps. The first transistor M1 is turned off, and the second transistor M2 is turned on. A loop 104 of the second capacitor C2, the second inductor L2, and the second primary winding 33 of the second transformer T2 is conducted. The primary current I3 is generated by the second transformer T2. The loop 104 turns on the fourth diode Dp and enters an electromagnetic interference filter 41.

Figure 10:
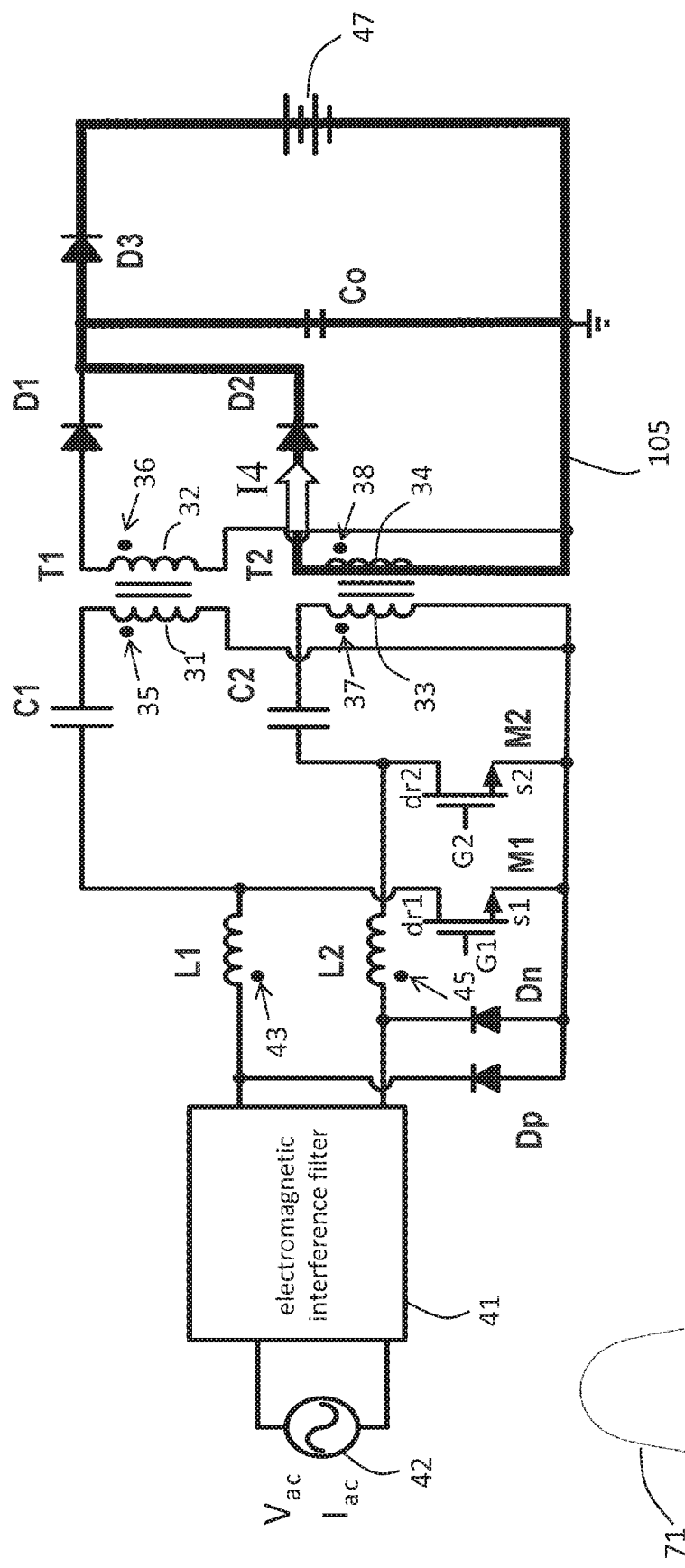
FIG. 10 is another diagram illustrating the step of performing the second step-up or step-down converting by the second transformer for the negative half-wave of the AC power of FIG. 4 in accordance with an embodiment of the present disclosure.

FIG. 10 is another diagram illustrating the step 80 of the distributed single-stage on-board charging method 75 in accordance with an embodiment of the present disclosure. The step 80 of performing a step-up or step-down converting by the second transformer T2, for the negative half-wave 72 of the AC power 42, further comprises the following steps. The first transistor M1 is turned off, and the second transistor M2 is turned off. Secondary current I4 is generated by the second transformer T2. A loop 105 of the second diode D2, the third capacitor Co, the third diode D3, and the electric vehicle rechargeable battery 47.

Figure 11:
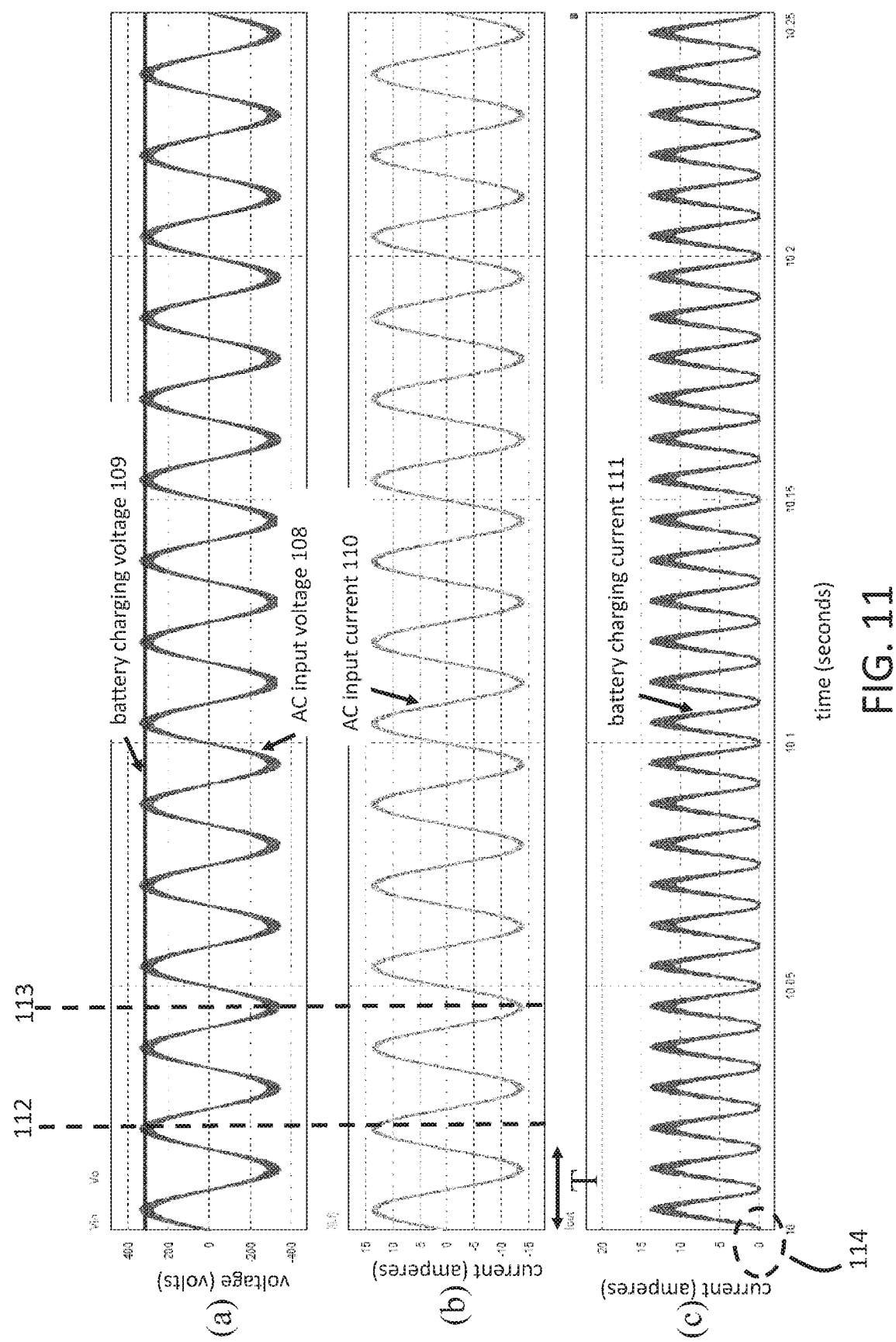
FIG. 11 shows a waveform chart illustrating the distributed single-stage on-board charging device in accordance with an embodiment of the present disclosure.

FIG. 11 shows a waveform chart illustrating the distributed single-stage on-board charging device 30 in accordance with an embodiment of the present disclosure. A chart (a) of FIG. 11 shows the horizontal axis in time (seconds) and the vertical axis in voltage (volts). The sine wave represents an AC input voltage 108, and the AC input voltage 108 refers to signals of the AC voltage terminal $V_{ac}$ of the AC power 42. The AC input voltage 108 ranges between ±300 volts. The horizontal line represents a battery charging voltage 109, and the battery charging voltage 109 refers to voltage values of the electric vehicle rechargeable battery 47. The battery charging voltage 109 is about 300 volts.

A chart (b) of FIG. 11 shows the horizontal axis in time (seconds) and the vertical axis in current (amperes). The sine wave represents an AC input current 110, and the AC input current 110 refers to signals of the AC current terminal $I_{ac}$. The AC input current 110 ranges between ±15 amperes. A chart (c) of FIG. 11 shows the horizontal axis in time (seconds) and the vertical axis in current (amperes). The sine wave represents a battery charging current 111. After the AC power 42 is inputted to the distributed single-stage on-board charging device 30, associating with the distributed single-stage on-board charging method 75, the distributed single-stage on-board charging device 30 outputs the battery charging current 111. The battery charging current 111 charges the electric vehicle rechargeable battery 47. The range of the battery charging current 111 is between 0 and 15 amperes. The battery charging current 111 is a pulsating DC current.

After the distributed single-stage on-board charging device 30 performs a power factor correction on the AC power 42, a phase of the AC input voltage 108 is in phase with a phase of the AC input current 110. A dashed line 112 represents that a peak of the AC input voltage 108 corresponds to and aligns with a peak of the AC input current 110. A dashed line 113 represents that a valley of the AC input voltage 108 corresponds to and aligns with a valley of the AC input current 110. The generation of virtual work is reduced, and the utilization efficiency of energy is improved. In addition, the distributed single-stage on-board charging device 30 is able to output a pulsating DC current. A circle 114 represents that a magnitude of the battery charging current 111 is greater than 0, which is a positive current. In addition, the battery charging current 111 is a sine wave charging current having two times of line frequency. That is, when a waveform having a period T is inputted, a waveform having two periods is outputted.

Figure 12:
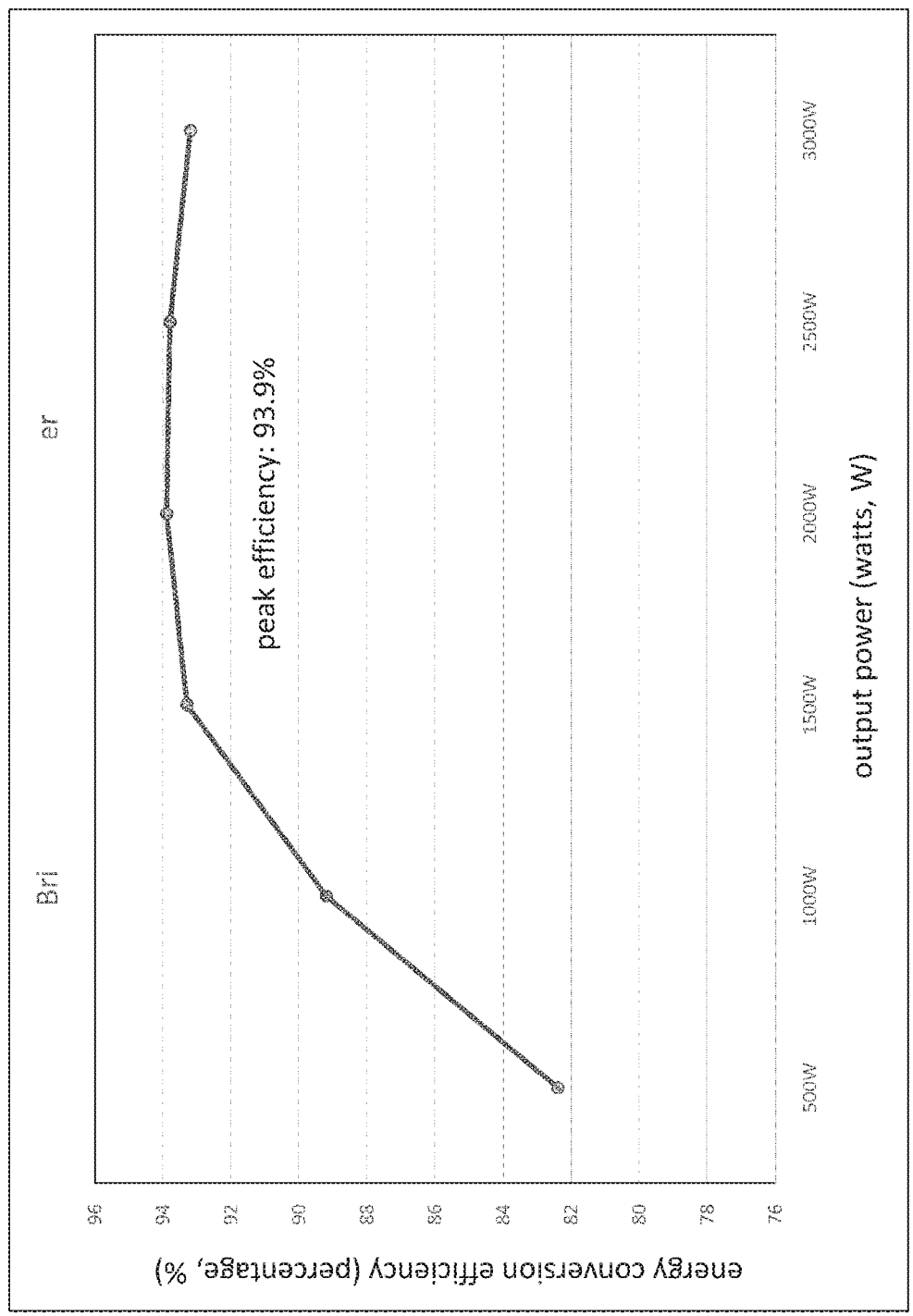
FIG. 12 is a line chart illustrating efficiency of the distributed single-stage on-board charging device in accordance with an embodiment of the present disclosure.

FIG. 12 is a line chart illustrating efficiency of the distributed single-stage on-board charging device 30 in accordance with an embodiment of the present disclosure. The horizontal axis represents an output power (watts, W), and the vertical axis represents an energy conversion efficiency (percentages, %). The energy conversion efficiency equals to the output power divided by the input power. When the output power is 500 W, the energy conversion efficiency is about 82.3%. When the output power is 1000 W, the energy conversion efficiency is about 89%. When the output power is 1500 W, the energy conversion efficiency is about 93%. When the output power is 2000 W, the energy conversion efficiency is about 93.9%. When the output power is 2500 W, the energy conversion efficiency is about 93.5%. When the output power is 3000 W, the energy conversion efficiency is about 93%. The distributed single-stage on-board charging device 30 has a peak efficiency of 93.9%, so the distributed single-stage on-board charging device 30 has a high-energy conversion efficiency.

Figure 13:
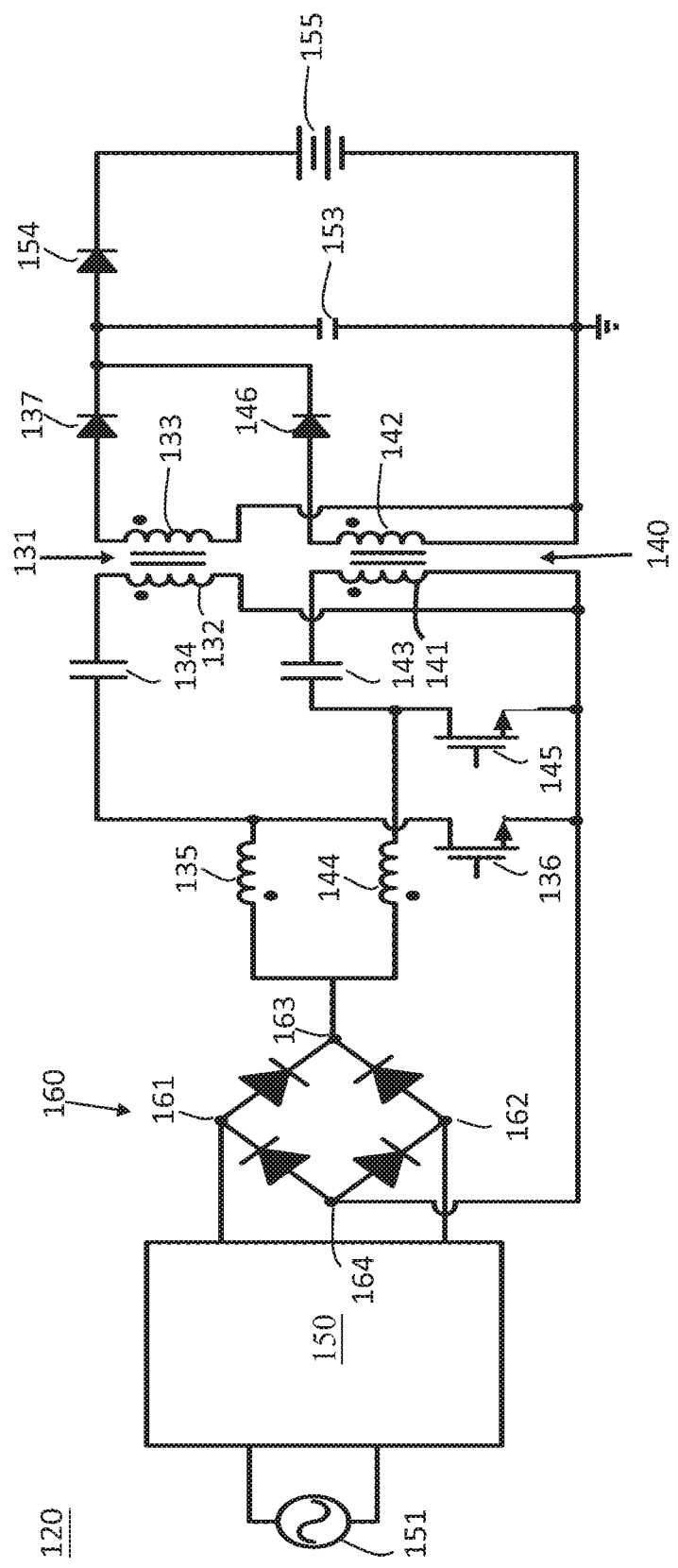
FIG. 13 is a circuit diagram illustrating a distributed single-stage on-board charging device in accordance with an embodiment of the present disclosure.

FIG. 13 is a circuit diagram illustrating a distributed single-stage on-board charging device 120 in accordance with an embodiment of the present disclosure. The distributed single-stage on-board charging device 120 is similar to the distributed single-stage on-board charging device 30. The distributed single-stage on-board charging device 120 comprises a third transformer 131 having a third primary winding 132 and a third secondary winding 133; a capacitor 134 connected to the third primary winding 132; an inductor 135 connected to the capacitor 134, wherein the capacitor 134 is located between the inductor 135 and the third transformer 131; a third transistor 136 connected to the capacitor 134 and the inductor 135; a diode 137 connected to the third secondary winding 133; a fourth transformer 140 having a fourth primary winding 141 and a fourth secondary winding 142, wherein the third transformer 131 and the fourth transformer 140 are connected in parallel; a capacitor 143 connected to the fourth primary winding 141; an inductor 144 connected to the capacitor 143, wherein the capacitor 143 is located between the inductor 144 and the fourth transformer 140; a fourth transistor 145 connected to the capacitor 143 and the inductor 144; and a diode 146 connected to the fourth secondary winding 142, wherein the diode 137 and the diode 146 are connected in parallel.

In an embodiment, the distributed single-stage on-board charging device 120 further comprises an electromagnetic interference filter 150 located between an AC power 151 and the inductor 135, also located between the AC power 151 and the inductor 144. The distributed single-stage on-board charging device 120 further comprises a capacitor 153 connected to a cathode of the diode 137 and a cathode of the diode 146. Another end of the capacitor 153 is grounded. The distributed single-stage on-board charging device 120 further comprises an electric vehicle rechargeable battery 155 and a diode 154. A cathode of the electric vehicle rechargeable battery 155 is grounded.

The main difference between the distributed single-stage on-board charging device 30 of FIG. 2 and the distributed single-stage on-board charging device 120 of FIG. 13 is that the fourth diode Dp and the fifth diode Dn are replaced by a full bridge rectifier 160. AC terminals 161 and 162 of the full bridge rectifier 160 are connected to an electromagnetic interference filter 150. A DC terminal 163 of the full bridge rectifier 160 connects to the inductor 135 and the inductor 144. The other DC terminal 164 of the full bridge rectifier 160 connects to an end of the third primary winding 132, an end of the second primary winding 141, the third transistor 136, and the fourth transistor 145.

Figure 14:
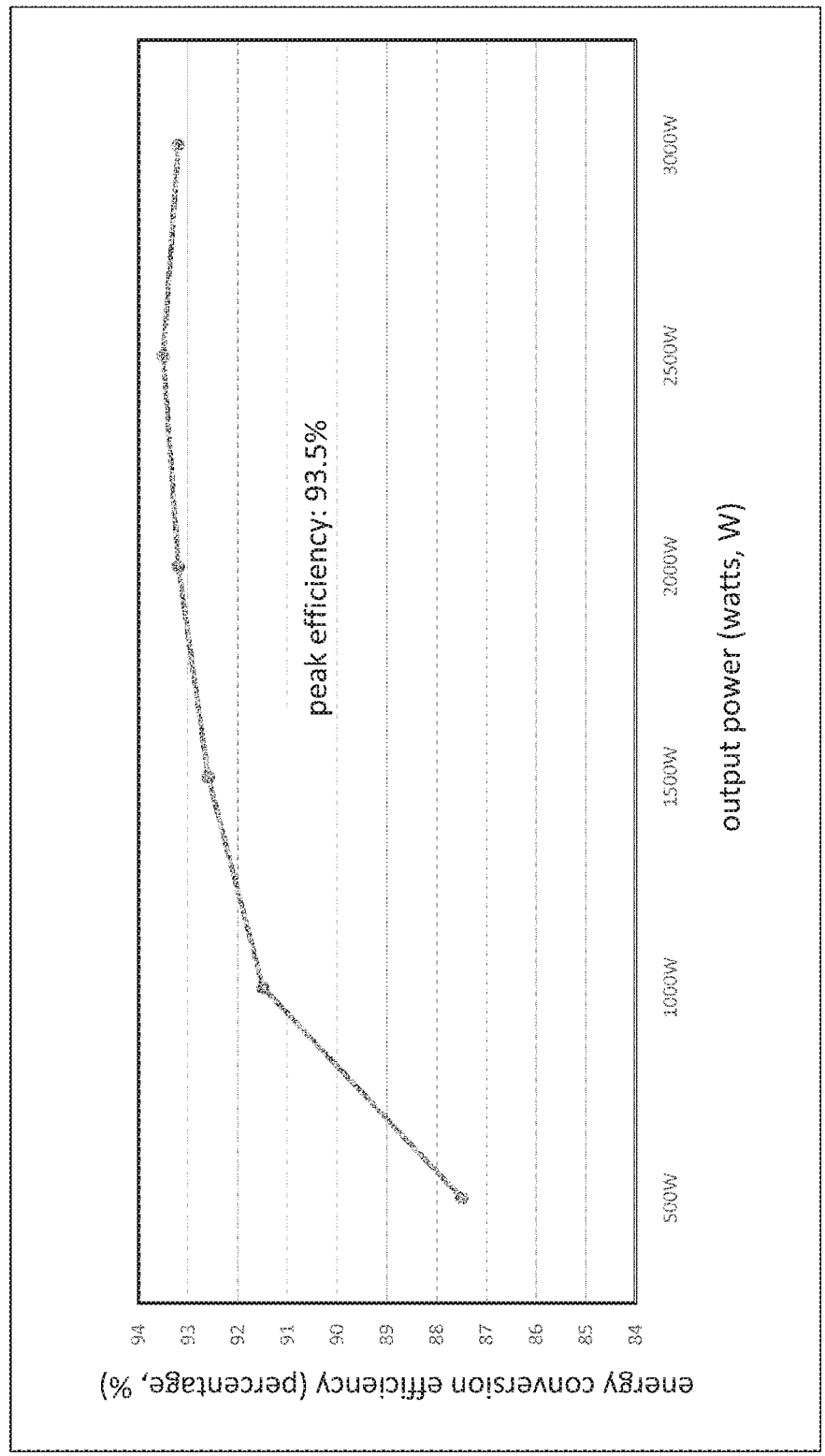
FIG. 14 is a line chart illustrating efficiency of the distributed single-stage on-board charging device in accordance with an embodiment of the present disclosure.

FIG. 14 is a line chart illustrating efficiency of the distributed single-stage on-board charging device 120 in accordance with an embodiment of the present disclosure. The horizontal axis represents an output power (watts, W), and the vertical axis represents an energy conversion efficiency (percentage, %). The energy conversion efficiency equals to the output power divided by the input power. When the output power is 500 W, the energy conversion efficiency is about 87.5%. When the output power is 1000 W, the energy conversion efficiency is about 91.5%. When the output power is 1500 W, the energy conversion efficiency is about 92.7%. When the output power is 2000 W, the energy conversion efficiency is about 93.4%. When the output power is 2500 W, the energy conversion efficiency is about 93.5%. When the output power is 3000 W, the energy conversion efficiency is about 93.4%. The distributed single-stage on-board charging device 120 has a peak efficiency of 93.5%, so the distributed single-stage on-board charging device 120 has high energy conversion efficiency.

In brief, the present disclosure provides a distributed single-stage on-board charging device and a method thereof. The distributed single-stage on-board charging device is characterized by its implementation of a two-phase interlaced. Each phase is responsible for the power conversion and transmission of a positive half-wave and a negative half-wave of an AC power. The distributed single-stage on-board charging device outputs a charging current, which is a sine wave current having double line frequency and is also a pulsating DC current. As such, the charging efficiency, the charging time, and the maximum temperature rise for an electric vehicle rechargeable battery are improved. In addition, the transformers for the two phases are respectively responsible for a step-up or step-down converting of the positive half-wave and the negative half-wave. The high power is distributed in order to avoid excessive power load. Further, the use of the transformers provides functions of high voltage electrical isolation. The main architecture of the distributed single-stage on-board charging device needs only 14 components. For example, the distributed single-stage on-board charging device 30 having two active switches omits a DC to DC converter and achieves a step-up or step-down converting. Associating with the distributed single-stage on-board charging method, the power factor correction is effectively achieved so as to improve the charging quality and reduce the costs.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

What is claimed is:

1. A distributed single-stage on-board charging device, connected to an AC power source and generating a pulsating DC current, and comprising:
   a first transformer having a first primary winding and a first secondary winding;
   a first capacitor connected to the first primary winding;
   a first inductor connected to the first capacitor, wherein the first capacitor is located between the first inductor and the first transformer;
   a first transistor connected to the first capacitor and the first inductor;
   a first diode connected to the first secondary winding;
   a second transformer having a second primary winding and a second secondary winding, wherein the first transformer and the second transformer are connected in parallel;
   a second capacitor connected to the second primary winding;
   a second inductor connected to the second capacitor, wherein the second capacitor is located between the second inductor and the second transformer;
   a second transistor connected to the second capacitor and the second inductor; and
   a second diode connected to the second secondary winding, wherein the first diode and the second diode are connected in parallel;
   wherein an end of the first primary winding connects to an end of the second primary winding, a source terminal of the first transistor, and a source terminal of the second transistor; and an end of the first secondary winding and an end of the second secondary winding are grounded.

2. The distributed single-stage on-board charging device according to claim 1, wherein a starting winding end of the first primary winding connects to the first capacitor, and an anode of the first diode connects to the first secondary winding.

3. The distributed single-stage on-board charging device according to claim 1, wherein a starting winding end of the second primary winding connects to the second capacitor, and the second secondary winding connects to an anode of the second diode.

4. The distributed single-stage on-board charging device according to claim 1, wherein a drain terminal of the first transistor connects to the first capacitor and the first inductor, a drain terminal of the second transistor connects to the second capacitor and the second inductor, and a source terminal of the first transistor connects to a source terminal of the second transistor.

5. The distributed single-stage on-board charging device according to claim 1, further comprising:
   an electromagnetic interference filter located between a two phases (AC) power and the first inductor, also located between the AC power and the second inductor, and a starting winding end of the first inductor and a starting winding end of the second inductor respectively connect to the electromagnetic interference filter.

6. The distributed single-stage on-board charging device according to claim 5, further comprising:
a full bridge rectifier, wherein an AC terminal of the full bridge rectifier connects to the electromagnetic interference filter, one direct current (DC) terminal of the full bridge rectifier connects to the first inductor and the second inductor, another DC terminal of the full bridge rectifier connects to an end of the first primary winding, an end of the second primary winding, a source terminal of the first transistor, and a source terminal of the second transistor.

7. The distributed single-stage on-board charging device according to claim 1, further comprising:
a third capacitor, wherein one end of the third capacitor is connected to a cathode of the first diode and a cathode of the second diode, and another end of the third capacitor is grounded.

8. The distributed single-stage on-board charging device according to claim 7, further comprising:
an electric vehicle rechargeable battery, wherein a cathode of the electric vehicle rechargeable battery is grounded; and
a third diode, wherein an anode of the third diode connects to the third capacitor, the cathode of the first diode, and the cathode of the second diode, and an anode of the electric vehicle rechargeable battery connects to a cathode of the third diode.

9. The distributed single-stage on-board charging device according to claim 1, further comprising:
a fourth diode, wherein a cathode of the fourth diode connects to a starting winding end of the first inductor; and
a fifth diode, wherein a cathode of the fifth diode connects to a starting winding end of the second inductor,
wherein an anode of the fourth diode connects to an anode of the fifth diode, a source terminal of the first transistor, a source terminal of the second transistor, an end of the first primary winding, and an end of the second primary winding.

10. The distributed single-stage on-board charging device according to claim 1, further comprising:
a charging mode control circuit coupled to the first transistor and the second transistor; and
a power factor correction control circuit connected to the charging mode control circuit, wherein two output terminals of the power factor correction control circuit respectively connect to a gate terminal of the first transistor and a gate terminal of the second transistor.

11. The distributed single-stage on-board charging device according to claim 10, wherein the charging mode control circuit comprises:
a first adder connected to a current feedback terminal and a current reference command terminal, and configured to output a first difference value between the current feedback terminal and the current reference command terminal;
a sixth diode connected to the first adder;
a second adder connected to a voltage feedback terminal and a voltage reference command terminal, and configured to output a second difference value between the voltage feedback terminal and the voltage reference command terminal; and
a seventh diode connected to the second adder, wherein the sixth diode and the seventh diode are connected in parallel.

12. The distributed single-stage on-board charging device according to claim 11, wherein the charging mode control circuit comprises:
a first proportional integral controller, wherein an input terminal of the first proportional integral controller connects to an anode of the sixth diode and an anode of the seventh diode; and
a low pass filter, wherein an input terminal of the low pass filter connects to an output terminal of the first proportional integral controller.

13. The distributed single-stage on-board charging device according to claim 10, wherein the power factor correction control circuit comprises:
a multiplier connected to an output terminal of the charging mode control circuit and a full-wave rectified AC voltage terminal;
a third adder connected to an output terminal of the multiplier and a full-wave rectified AC current terminal;
a second proportional integral controller connected to an output terminal of the third adder; and
an amplitude limiter connected to an output terminal of the second proportional integral controller.

14. The distributed single-stage on-board charging device according to claim 13, wherein the power factor correction control circuit comprises:
a first comparator, wherein a positive terminal of the first comparator connects to the second proportional integral controller, and a negative terminal of the first comparator connects to a high-frequency sawtooth wave terminal;
a second comparator, wherein a positive terminal of the second comparator connects to an AC voltage terminal, and a negative terminal of the second comparator is grounded;
a first AND gate; and
a second AND gate,
wherein an output terminal of the first comparator connects to the first AND gate and the second AND gate, and an output terminal of the second comparator connects to the first AND gate.

15. The distributed single-stage on-board charging device according to claim 14, wherein the power factor correction control circuit comprises:
a NOT gate located between the second AND gate and the second comparator, an input terminal of the NOT gate connects to the output terminal of the second comparator, and an output terminal of the NOT gate connects to the second AND gate.

16. A distributed single-stage on-board charging method, comprising:
inputting an alternating current (AC) power;
determining whether a constant voltage mode or a constant current mode is operating;
performing a power factor correction on an AC current terminal and an AC voltage terminal of the AC power;
turning on a first transistor, turning off a second transistor, conducting a loop of a first capacitor, a first inductor, and a first primary winding of a first transformer, and generating a first primary current by the first transformer for a positive half-wave of the AC power;
turning off the first transistor, turning off the second transistor, generating a first secondary current by the first transformer and conducting a loop of a first diode and an electric vehicle rechargeable battery so as to perform, by the first transformer, a first step-up or step-down converting for the positive half-wave of the AC power;

turning off a first transistor, turning on a second transistor, conducting a loop of a second capacitor, a second inductor, and a second primary winding of a second transformer, and generating a second primary current by the second transformer for a negative half-wave of the AC power;

turning off the first transistor, turning off the second transistor, generating the second secondary current by the second transformer and conducting a loop of a second diode and an electric vehicle rechargeable battery so as to perform, by the second transformer, a second step-up or step-down converting for the negative half-wave of the AC power; and outputting a pulsating DC current.

17. The distributed single-stage on-board charging method according to claim 16, wherein the step of determining whether the constant voltage mode or the constant current mode is operating further comprises:

subtracting a current feedback value from a current reference command value, and generating a current error signal;

subtracting a voltage feedback value from a voltage reference command value, and generating a voltage error signal; and comparing values of the current error signal and the voltage error signal.

18. The distributed single-stage on-board charging method according to claim 17, wherein the step of determining whether the constant voltage mode or the constant current mode is operating further comprises:

according to a result of the comparing, determining whether the current error signal or the voltage error signal enters a first proportional integral controller, and performing a proportional integral adjustment; and entering an output signal of the first proportional integral controller into a low pass filter, and generating a charge control signal.

19. The distributed single-stage on-board charging method according to claim 16, wherein the step of performing the power factor correction on the AC current terminal and the AC voltage terminal of the AC power further comprises:

multiplying, by a multiplier, a charge control signal by a full-wave rectified AC voltage, and generating an AC current reference command; and subtracting, by an adder, a full-wave rectified AC current from the AC current reference command, and generating an AC current error command.

20. The distributed single-stage on-board charging method according to claim 19, wherein the step of performing the power factor correction on the AC current terminal and the AC voltage terminal of the AC power further comprises:

performing, by a second proportional integral controller, a proportional integral adjustment on the AC current error command; and receiving, by an amplitude limiter, an output signal of the second proportional integral controller, and generating a power factor correction control signal.

21. The distributed single-stage on-board charging method according to claim 20, wherein the step of performing the power factor correction on the AC current terminal and the AC voltage terminal of the AC power further comprises:

receiving, by a first comparator, the power factor correction control signal and a sawtooth wave signal;

receiving, by a second comparator, the AC power and a ground signal;

performing, by a first AND gate, a first intersection of an output signal of the first comparator and an output signal of the second comparator; and performing, by a second AND gate, a second intersection of the output signal of the first comparator and an inverted signal of the output signal of the second comparator.

* * * * *